April 8, 1952  C. G. M. ARMAND  2,592,232
MOLD FOR MOLDING SWEETMEATS
Filed Nov. 9, 1948
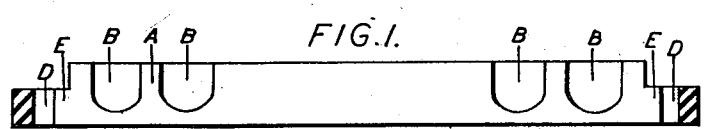
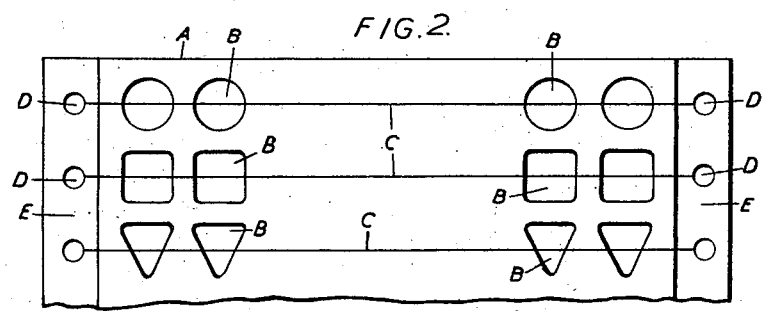
Inventor
Clifford Gamble Marts Armand
By Patented Apr. 8, 1952

2,592,232

UNITED STATES PATENT OFFICE 2,592,232

MOLD FOR MOLDING SWEETMEATS

Clifford Gamble Marks Armand, Cheltenham, England

Application November 9, 1948, Serial No. 59,040
In Great Britain September 3, 1947

4 Claims. (Cl. 107—19)

This invention relates to moulds for moulding any kind of sweet or confection that has to be run into a mould in liquid form and removed therefrom when sufficiently set for handling purposes or further treatment.

The only known way of making soft creams at the present time is to run the cream or other liquid by hand or by a machine into moulds made in starch. The use of starch is objectionable in many respects and possesses many disadvantages. Moulds for making a fairly firm cream and chrystallized goods can be made in flexible material such for example as sheets of rubber formed with pockets of any desired shape or size into which the cream or other liquid is run by hand or by a machine, the subsequent removal of the set or partly set material in the moulds being effected by inverting the rubber sheet or mat over a tray or table and then bending or twisting it so that the contents of the moulds fall out.

This is not altogether satisfactory particularly where the rubber sheets or mats are large and contain a large number of moulds as it is difficult so to manipulate the rubber sheets or mats that the distortion required to free all of the moulded sweets or confections from their respective moulds can be done without damaging some of the sweets or confections during the distortion and subsequent removal.

The present invention has for its object so to construct the flexible molds that the removal of their contents is greatly facilitated and can be carried out without any risk of damaging the sweets or confections irrespective of the size of the flexible sheets or mats and the number of moulds that they contain.

According to this invention separable moulds are made in a sheet or mat of flexible material such for example as rubber.

This material may be of such a character that it will keep the moulds in a non-separated condition due to its own resiliency or the sheet or mat may be removably mounted in a frame or tray which will keep the moulds in a non-separated condition.

In the accompanying drawings:

Fig. 1 is a section and Fig. 2 a plan of a sweet moulding mat constructed in accordance with this invention.

Referring to Figs. 1 and 2 A indicates a portion of a rubber or other flexible mat formed with moulds B made in the form of pockets. These pockets extend part way through the mat and they may be made of various shapes a few of which are shown by way of example in Fig. 2.

The mat is formed either by cutting or moulding with a number of slits C which extend through each row of moulds, preferably at the centre or thereabouts to a short distance from the edge of the mat, where the slits run into holes D which extend through the mat as shown in Fig. 1. Each end of the mat is advantageously though not necessarily formed with a rebate E which facilitates picking the mat up. The mat may be placed in a frame which will close the slits, or the latter may normally remain closed due to the nature of the material of which the mat is made, or by a non-slit backing of flexible material which may be vulcanized or cemented to the mould.

Owing to the ease with which the sweets or confections can be removed from the moulds, they will not have to remain therein so long for the material to set as their removal can be safely effected when they are in a very slightly set condition in which they could not be safely removed from inseparable moulds formed in a rubber sheet or mat.

What I claim as my invention and desire to secure by Letters Patent of the United States is:

1. A resilient flat mat for making soft candies having a top face and a bottom face, comprising in combination, a mould-carrying portion bordered along an edge by a strip-shaped edge portion, said edge portion having a plurality of spaced holes extending from the top face to the bottom face thereof, said mould-carrying portion having a plurality of slits extending substantially parallel to each other and normal to said edge portion, said slits ending, respectively, in the holes in said edge portion, said slits extending from the top face to the bottom face of said mat and thus forming a plurality of substantially parallel strips reaching into said edge portion of said mat up to the holes extending through the same, said strips having pairs of complementary moulds on either side of said slits located outside of said strip-shaped edge portion of said mat, the pair of complementary moulds in each of said slits located nearest to the hole at the end of the respective slit being spaced from the hole at least by a distance equalling the distance of the two adjacent pairs of moulds from each other, the easy bendability of said strips relative to one another obtained by said holes at the ends of said slits permitting easy removal of candies formed in said moulds without damaging of the candies and permitting repeated bending of said strips relative to one another without tearing of said mat at the ends of said slits forming said strips.

2. A resilient flat mat for making soft candies having a top face and a bottom face, comprising in combination, a mould-carrying portion bordered along an edge by a strip-shaped edge portion, said edge portion being of lesser thickness than said mould-carrying portion of said mat, said edge portion having a plurality of spaced holes extending from the top face to the bottom face thereof, said mould-carrying portion having a plurality of slits extending substantially parallel to each other and normal to said edge portion, said slits ending, respectively, in the holes in said edge portion, said slits extending from the top face to the bottom face of said mat and thus forming a plurality of substantially parallel strips reaching into said edge portion of said mat up to the holes extending through the same, said strips having complementary moulds on either side of said slits located outside of said strip-shaped edge portion of said mat, the easy bendability of said strips relative to one another obtained by said holes at the ends of said slits and by the reduced thickness of said edge portion permitting easy removal of candies formed in said moulds without damaging of the candies and permitting repeated bending of said strips relative to one another without tearing of said mat at the ends of said slits forming said strips.

3. A resilient flat mat for making soft candies having a top face and a bottom face, comprising in combination, a mould-carrying portion bordered along opposite edges thereof by strip-shaped edge portions, respectively, said edge portions having each a plurality of spaced holes extending from the top face to the bottom face thereof, said mould-carrying portion having a plurality of slits extending substantially parallel to each other and normal to said edge portions, said slits ending, respectively, in the holes in said edge portions, said slits extending from the top face to the bottom face of said mat and thus forming a plurality of substantially parallel strips reaching into said edge portions of said mat up to the holes extending through the same, and strips having pairs of complementary moulds on either side of said slits located outside of said strip-shaped edge portions of said mat, the pair of complementary moulds in each of said slits located nearest to the hole at the end of the respective slit being spaced from the hole at least by a distance equalling the distance of the two adjacent pairs of moulds from each other, the easy bendability of said strips relative to one another obtained by said holes at the ends of said slits permitting easy removal of candies formed in said moulds without damaging of the candies and permitting repeated bending of said strips relative to one another without tearing of said mat at the ends of said slits forming said strips.

4. A resilient flat mat for making soft candies having a top face and a bottom face, comprising in combination, a mould-carrying portion bordered along opposite edges thereof by strip-shaped edge portions, respectively, said edge portions being of lesser thickness than said mould-carrying portion, said edge portions having each a plurality of spaced holes extending from the top face to the bottom face thereof, said mould-carrying portion having a plurality of slits extending substantially parallel to each other and normal to said edge portions, said slits ending, respectively, in the holes in said edge portions, said slits extending from the top face to the bottom face of said mat and thus forming a plurality of substantially parallel strips reaching into said edge portions of said mat up to the holes extending through the same, said strips having complementary moulds on either side of said slits located outside of said strip-shaped edge portions of said mat, the easy bendability of said strips relative to one another obtained by said holes at the ends of said slits and by the reduced thickness of said edge portions permitting easy removal of candies formed in said molds without damaging of the candies and permitting repeated bending of said strips relative to one another without tearing of said mat at the ends of said slits forming said strips.

CLIFFORD GAMBLE MARKS ARMAND.

REFERENCES CITED

The following references are of record in the file of this patent:

UNITED STATES PATENTS

| Number | Name | Date |
| --- | --- | --- |
| Re. 9,197 | Lockwood | May 11, 1880 |
| 382,678 | Ball | May 15, 1888 |
| 398,368 | Ball | Feb. 26, 1889 |
| 449,869 | Ball | Apr. 7, 1891 |
| 853,537 | Dubisee | May 14, 1907 |
| 2,115,281 | Potdeuin | Apr. 26, 1938 |

FOREIGN PATENTS

| Number | Country | Date |
| --- | --- | --- |
| 29,295 | Great Britain | Dec. 31, 1904 |